United States Patent
Gannon et al.

(10) Patent No.: US 6,485,639 B1
(45) Date of Patent: Nov. 26, 2002

(54) SEPARATION OF HYDROCARBONS FROM HYDROCARBON CONTAINING LIQUID

(75) Inventors: William J. Gannon, North Haven, CT (US); John Muir, Guelph (CA); Glenn T. Van Lier, Somerville, NJ (US)

(73) Assignee: Solidification Products International, Inc., North Haven, CT (US)

( * ) Notice: Subject to any disclaimer, the term of this patent is extended or adjusted under 35 U.S.C. 154(b) by 0 days.

(21) Appl. No.: 09/227,654

(22) Filed: Jan. 7, 1999

(51) Int. Cl.$^7$ .................................................. E03F 5/16
(52) U.S. Cl. ...................... 210/164; 210/170; 210/282; 210/502.1; 210/503; 210/693; 210/100; 404/4
(58) Field of Search ................................ 210/163, 164, 210/165, 170, 282, 502.1, 503, 504, 505, 100, 288, 693; 404/2–5

(56) References Cited

U.S. PATENT DOCUMENTS

| | | | | |
|---|---|---|---|---|
| 3,322,695 A | * | 5/1967 | Alfrey, Jr. et al. | |
| 5,223,154 A | * | 6/1993 | MacPherson, Jr. et al. | 210/163 |
| 5,364,535 A | * | 11/1994 | Buckalew | 210/924 |
| 5,383,745 A | * | 1/1995 | Shannon | 210/164 |
| 5,391,295 A | * | 2/1995 | Wilcox et al. | 210/165 |
| 5,403,491 A | * | 4/1995 | Holland | 210/747 |
| 5,511,904 A | * | 4/1996 | Van Egmond | 210/164 |
| 5,662,801 A | * | 9/1997 | Holland | 210/282 |
| 5,679,246 A | * | 10/1997 | Wilcox et al. | 210/165 |
| 5,720,574 A | * | 2/1998 | Barella | 210/164 |
| 5,767,060 A | * | 6/1998 | Hanrahan | 210/502.1 |
| 5,788,849 A | * | 8/1998 | Hutter, Jr. et al. | 210/163 |
| 5,820,762 A | * | 10/1998 | Bamer et al. | 210/164 |
| 5,833,862 A | * | 11/1998 | Holland | 210/282 |
| 5,849,198 A | * | 12/1998 | Sharpless | 210/164 |
| 5,863,440 A | * | 1/1999 | Rink et al. | 210/693 |
| 5,904,842 A | * | 5/1999 | Billias et al. | 210/163 |
| 5,925,241 A | * | 7/1999 | Aldridge et al. | 210/163 |
| 6,143,172 A | * | 11/2000 | Rink et al. | 210/693 |

* cited by examiner

*Primary Examiner*—Robert J. Popovics
(74) *Attorney, Agent, or Firm*—DeLio & Peterson, LLC

(57) ABSTRACT

A novel filtration media employing polymeric absorbents comprising a material selected from the group consisting of styrene, pentadiene, cyclopentadiene, butylene, ethylene, isoprene, butadiene, propylene and mixtures thereof; and a filtration enabler intimately mixed with the polymeric absorbent. Preferably, the filtration enabler comprises clay, ground glass, talc, mica, recycled rubber, sand, gravel, vermiculite, recycled plastic chips, an inert, non-absorbent material, or mixtures thereof. Preferably, the polymeric absorbent may be further compounded to incorporate about 10 to 50% recycled or waste plastic scrap, scrap polyolefins, inorganic fillers, or other inexpensive, relatively inert solids. Other compounding materials may include clay, talc, mica, ground glass, silica, and mixtures thereof. Upon contact with a hydrocarbon containing liquid, the liquid partially dissolves the polymeric absorbent forming a partial filtration barrier prior to the filtration media substantially absorbing the hydrocarbons, and allowing hydrocarbon-free liquid to flow through the filtration media. In situations of a leak or spill wherein an excess of hydrocarbons are present, the filtration media forms a plug to seal and prevent further discharge of the hydrocarbons. The filtration media may be placed inside a portable container for insertion into an existing drain such that hydrocarbon containing liquid is filtered through the device allowing hydrocarbon-free liquid to flow from the device. The filtration media has a thickness within the container adapted to substantially filter out hydrocarbons while capable of forming a plug in an excess of hydrocarbons. The filtration media of the present invention may be employed in pits, pipes, and self-contained cartridges of various sizes to remove and contain hydrocarbons from a hydrocarbon containing liquid or a hydrocarbon spill or leak, and that the absorbent will form a plug in an excess of hydrocarbons entering the pit, pipe or cartridge. Also described are methods of filtering and preventing discharge of a hydrocarbon containing liquid.

21 Claims, 2 Drawing Sheets

SEPARATION OF HYDROCARBONS FROM HYDROCARBON CONTAINING LIQUID

BACKGROUND OF THE INVENTION

1. Field of the Invention

The present invention relates to a method of and device for removing and solidifying hydrocarbon oils and solvents from liquid. More specifically, the present invention relates to a filtration media used to selectively remove oil, solvent and other hydrocarbon compounds from liquid such that the liquid is discharged in a clean state. This method will result in the passive, inexpensive and foolproof filtration of stormwater and process liquid from spill containment areas, process areas, parking lots, and any other potential source of hydrocarbon containing liquid. In the event of a hydrocarbon spill or leak wherein an excess of hydrocarbons contacts the filtration media, the filtration media will form a plug to effectively contain the spill or leak.

2. Description of Related Art

In many commercial and industrial applications and installations, to prevent contamination of the environment by oils and solvents, spill containment systems are built that not only trap the potential spilled liquids but also any process liquid or rain/snow-melt liquid that comes in contact with the spill containment area. Federal, state and local regulations that mandate spill protection to minimize or eliminate hydrocarbon discharges to the environment are becoming more and more strict. The challenge is not just to prevent the spill, but to be able to handle the rainwater or process liquid that could be contaminated with hydrocarbons. With stormwater quality regulations being applied to parking lots and roofing systems, the difficulty is not just handling the hydrocarbons, but separating it efficiently and economically from a large quantity of stormwater.

Measures to separate oil and solvents from liquid are well known in the art. Passive means of separating oil and solvents from liquid typically use weirs of various heights to allow the oil and solvents which are lighter than liquid to be concentrated by collection or containment above the weirs. The liquid layer flows under the weirs in a somewhat cleaned state. These separators are far from 100% effective and are utilized only under very specific conditions. However, those conditions are not practicable with stormwater or spill containment area liquid discharges.

A popular mechanical means known in the art is moving a fabric belt through the liquid and oil mixture. As the fabric belt moves through the liquid and oil mixture, the fabric absorbs some of the oil. The belt is then squeezed through a device which removes the oil thereby separating the oil from the liquid. Such a device is rather crude, requires constant maintenance and power to operate, and it simply cannot remove all of the oil/solvent. Discharge of the liquid, even after cleaning by such a separator, would result in a significant amount of hydrocarbons being delivered into the environment.

Another mechanical device uses centrifugal force to separate the liquid from the lighter oils and solvents. As with the belt-type device described earlier, the centrifuge method requires a great deal of maintenance, a significant investment in equipment and it is simply not practical for the application of stormwater/spill containment area liquid discharge.

Chemical means known in the art for separating hydrocarbons from liquid employ specific absorbents or adsorbents. Adsorbents such as vermiculite, sand, oleophilic clays, tree bark and other similar materials merely hold the oil and solvents on their surface. However, in a passive filtration system, the liquid flow would pull a substantial amount of the oil and solvent off the surface of the solid adsorbent. Not only are these materials substantially ineffective, but in the event of a major hydrocarbon spill or leak, these materials allow the hydrocarbons to pass through to the environment.

Polymeric absorbents, mainly in booms and pillows, are also used to selectively absorb hydrocarbons from standing liquid and liquid systems. Typically, the granular absorbent materials solidify upon absorption of hydrocarbons. However, absorbents of this type are undesirable in a passive filtration system since the solidification of the absorbents would only absorb the bulk floating hydrocarbons while allowing sheen to be discharged.

Bearing in mind the problems and deficiencies of the prior art, it is therefore an object of the present invention to provide a passive device for separating hydrocarbons from stormwater or spill containment areas capable of plugging and sealing off the containment area in the event of hydrocarbon overload as in a spill or leak.

It is another object of the present invention to provide a passive method for separating hydrocarbons from stormwater or spill containment areas capable of plugging and sealing off the containment area in the event of hydrocarbon overload as in a spill or leak.

It is yet another object of the present invention to provide a method of and device for filtering out hydrocarbons utilizing existing drainage and filtration resources capable of plugging and sealing off the containment area in the event of hydrocarbon overload as in a spill or leak.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a filtration media for removal of hydrocarbons from hydrocarbon containing liquid comprising: a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent. Upon contact with the hydrocarbon containing liquid, the hydrocarbons partially dissolve the polymeric absorbent prior to the filtration media substantially absorbing the hydrocarbons, while allowing hydrocarbon-free liquid to flow through the filtration media. The filtration media, upon contacting an excessive amount of hydrocarbons, forms a plug to seal and prevent further discharge of the hydrocarbons.

In another aspect, the present invention is directed to a hydrocarbon absorbing polymeric absorbent to prevent discharge of hydrocarbon containing liquid into an environment comprising a material selected from the group consisting of styrene, pentadiene, cyclopentadiene, butylene, ethylene, isoprene, butadiene, propylene and mixtures thereof, wherein upon contact with a hydrocarbon containing liquid, the polymeric absorbent forms a plug to seal off and prevent further discharge of the hydrocarbon containing liquid.

In a further aspect, the present invention is directed to a portable device for filtering hydrocarbons from hydrocarbon containing liquid comprising: a rigid container having a first end and a second end, the first end having an external lip and a first internal lip, and the second end having a second internal lip; a first porous layer disposed within the container on the second internal lip; and a filtration media comprising a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent, the filtration media compressed into the container. The device may be inserted into an existing drainage device such that a hydrocarbon containing liquid is filtered through the device allowing hydrocarbon-free liquid to flow from the device. Preferably, a gasket disposed under the external lip of the container provides a snug, temporary, leak proof seal when the container is inserted into an existing drainage device.

The hydrocarbon containing liquid flows through the container to contact the filtration media wherein the polymeric absorbent of the filtration media is adapted to form a tacky, semi-solid prior to absorption of the hydrocarbons creating a filtration barrier. Preferably, the filtration media has a thickness within the container adapted to substantially filter out hydrocarbons while capable of forming a plug in an excess of hydrocarbons.

Preferably, a float may be situated in a sufficient space within the container between the filtration media and the second internal lip wherein the float prevents back wash of any liquid through the container while allowing the hydrocarbon-free liquid to flow through.

In yet another aspect, the present invention is directed to a device for the containment of hydrocarbon containing liquid comprising: a rigid container having a first end and a second end, the first end having an external lip and a first internal lip, and the second end having a second internal lip; a first porous layer disposed within the container on the second internal lip; and a filtration media comprising a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent, the filtration media compressed into the container, wherein the device may be inserted into an existing drain such that upon contact with a hydrocarbon containing liquid having an excess of hydrocarbons, the filtration media forms a plug to seal and prevent further discharge of the hydrocarbon containing liquid. Preferably, a gasket is disposed under the external lip of the container to provide a snug, temporary, leak proof seal when the container is inserted into an existing drainage device.

In still yet another aspect, the present invention is directed to a method of filtering hydrocarbon containing liquid comprising the steps of: (a) providing a filtration media comprising a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent; (b) contacting the hydrocarbon containing liquid to the filtration media; and (c) removing hydrocarbons in the hydrocarbon containing liquid, wherein hydrocarbon-free liquid flows through the filtration media.

In yet another aspect, the present invention is directed to a method of preventing discharge of a hydrocarbon containing liquid containing an excessive amount of hydrocarbons comprising the steps of: (a) providing a filtration media comprising a polymeric absorbent comprising a material selected from the group consisting of styrene, pentadiene, cyclopentadiene, butylene, ethylene, isoprene, butadiene, propylene and mixtures thereof, and an amount of filtration enabler; (b) contacting the hydrocarbon containing liquid to the filtration media; (c) forming a plug of the filtration media; and (d) preventing discharge of the hydrocarbon containing liquid.

In still a further aspect, the present invention is directed to a method of filtering out hydrocarbons in an existing drainage system comprising the steps of: (a) providing a porous layer fitted to an existing drainage opening; (b) filling the drainage opening with filtration media comprising a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent; (c) providing a second porous layer over the filtration media; (d) contacting hydrocarbon containing liquid to the filtration media; and (e) filtering the hydrocarbon containing liquid such that clarified liquid flowing through the filtration media is substantially hydrocarbon-free. Preferably, step (b) comprises filling the drainage opening with an amount of filtration media adapted to form a plug when contacted by an excessive amount of hydrocarbons and preventing discharge of the hydrocarbon containing liquid.

In a final aspect, the present invention is directed to a method of preventing discharge of a hydrocarbon containing liquid through an existing drainage system comprising the steps of: (a) providing a porous layer fitted to an existing drainage opening; (b) filling the drainage opening with filtration media comprising a polymeric absorbent comprising a material selected from the group consisting of styrene, pentadiene, cyclopentadiene, butylene, ethylene, isoprene, butadiene, propylene and mixtures thereof; and a filtration enabler intimately mixed with the polymeric absorbent; (c) providing a second porous layer over the filtration media; (d) contacting the hydrocarbon containing liquid to the filtration media wherein the filtration media forms a plug; and (e) preventing discharge of the hydrocarbon containing liquid.

In all aspects of the present invention, the filtration enabler comprises recycled rubber, sand, gravel, vermiculite, recycled plastic chips, an inert, non-absorbent material, or a mixture thereof.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
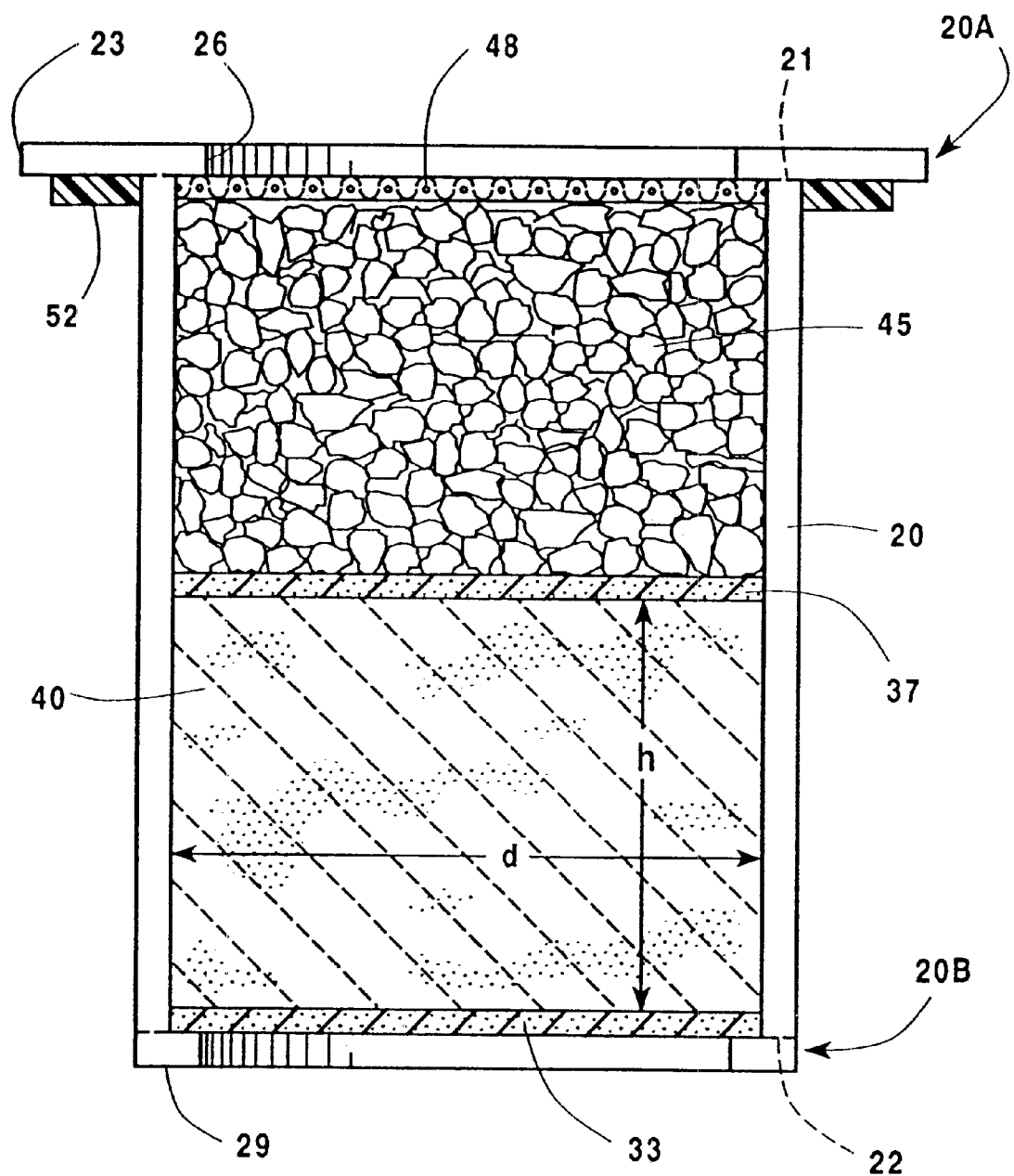
FIG. 1 is a cross-sectional view of a preferred embodiment of the present invention for use in an existing drainage device.

In describing the preferred embodiment of the present invention, reference will be made herein to FIGS. 1–2 of the drawings in which like numerals refer to like features of the invention. Features of the invention are not necessarily shown to scale in the drawings.

The present invention employs a filtration media comprising a novel mix of solid, oleophilic absorbents and a filtration enabler in a granulated state to absorb and filter out hydrocarbons from hydrocarbon containing liquid or contain a hydrocarbon spill or leak. The filtration media allows the clarified, hydrocarbon-free liquid to flow through for discharge or reuse while also capable of plugging and sealing off a containment area in the event of hydrocarbon overload as in a spill or leak. A preferred embodiment, shown in FIGS. 1 and 2, may be used in an existing gravity drain or in a pumped filter application to substantially absorb hydrocarbons that might be present in a discharge.

The polymeric absorbent of the present invention comprises varying amounts of linear or branched, diblocked or triblocked polymers of alternating units of styrene, pentadiene, cyclopentadiene, butylene, ethylene, isoprene, butadiene, propylene and mixtures thereof. These polymeric absorbents absorb hydrocarbon oils and solvents extremely well due to their solubility in hydrocarbons. Examples of such polymers include those sold under the brandnames of Shellvis® and Kraton® available through the Shell Chemical Company; Finaprene® available from Fina Oil & Chemical Company; and Stereon®, Duradene® or Diene® available from Firestone Synthetic Rubber & Latex Company. The particle size can be anywhere from a fine powder to about 3000 microns or more in size. Preferably, the particle size of the polymeric absorbent is about 200 to 700 microns.

Upon initial contact with a hydrocarbon containing liquid, granules of the polymeric absorbent become tacky but eventually returns to its granular state when the hydrocarbons are absorbed. Larger pellets or granules will not absorb the hydrocarbons as quickly as smaller particles but the flow of the hydrocarbon-free liquid will be higher. If the particle size of the polymeric absorbent is too large, the polymeric absorbent is unable to form a plug to seal off and contain a spill of hydrocarbons resulting in costly clean-up efforts. The polymeric absorbent may be pelletized, ground, or chopped to the desired particle size in order to control the rate of filtration and flow of the clarified, hydrocarbon-free liquid.

In situations where the hydrocarbon containing liquid has an excessive amount of hydrocarbons or is straight hydrocarbon solvent, the polymeric absorbent forms a tacky plug which will solidify to contain the hydrocarbon containing liquid and prevent its discharge. After correction of the hydrocarbon situation, the absorbent layers at the inlet side of the filtration media may be removed to reveal fresh, unplugged absorbent.

The different polymers of the polymeric absorbent may be used in varying amounts to preferentially absorb different hydrocarbons. The surface of the polymeric absorbent granules may also be treated to be more hydrophobic or more reactive to a specific hydrocarbon. For example, transformer oil is better absorbed by a polymeric absorbent containing a portion of butadiene; diesel fuel is best absorbed by polymeric absorbent containing a portion of isoprene. Various tackifying agents may be added to accelerate the plugging and solidification. The primary use of the polymeric absorbent granules is as a filter or drain to substantially remove any hydrocarbons from a hydrocarbon containing liquid while also capable of plugging and sealing off the hydrocarbons in the event of a large hydrocarbon spill or leak.

Most preferably, the polymeric absorbent is compounded in a Banbury mixer or extruder to incorporate 10 to 50% recycled or waste plastic scrap, scrap polyolefins, inorganic fillers, or other inexpensive, relatively inert solids. The plastic scrap may come from many sources such as consumer recycling operations, industrial waste streams such as disposable diaper scraps and plastic layer producers, amongst others. This polymeric blend being less expensive than the virgin polymeric absorbent may be utilized in varying the strength of the filtration media as will be discussed below. It will not absorb hydrocarbons or solidify as quickly as the filtration media comprising a polymeric absorbent made from pure polymers. By adding the polymeric blend to the filtration media, the unit will not plug on contact with small discharges of hydrocarbons and hydrocarbon sheen but allow hydrocarbon-free liquid to be discharged. Other compounding materials may also include clay, talc, mica, ground glass, silica, and mixtures thereof.

Preferably, the polymeric absorbent is intimately mixed with a filtration enabler such as recycled rubber, sand, gravel, vermiculite, recycled plastic chips, an inert, non-absorbent material, or a mixture thereof, to create channels within the polymeric absorbent allowing a good overall flow rate through the mixture. Generally, the filtration enabler should be about the same particle size as the polymeric absorbent. Mixing approximately up to about 10 to 75% filtration enabler with the polymeric absorbent will result in a filtration media that will absorb hydrocarbons efficiently, allow good overall flow through the filtration media while still capable of forming a plug in the event of hydrocarbon overload.

Figure 2:
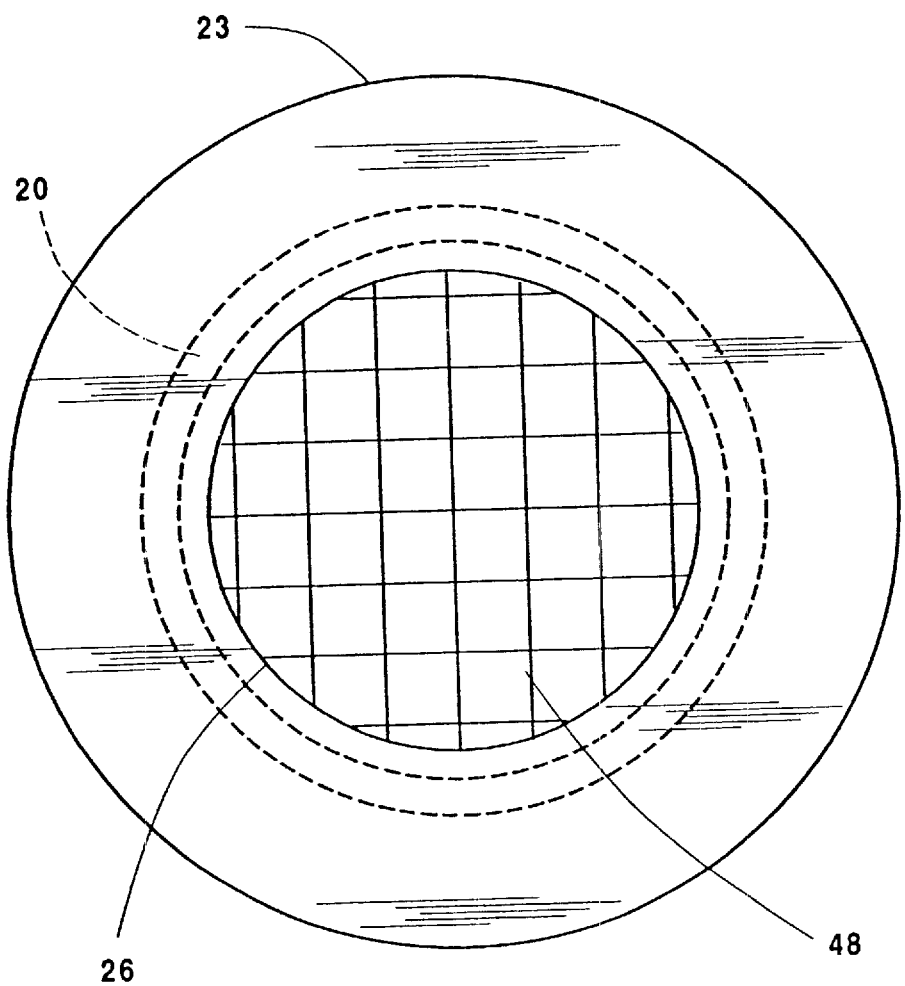
FIG. 2 is a top plan view of a preferred embodiment of the present invention for use in an existing drainage device.

FIG. 1 shows a preferred embodiment of the present invention utilizing the filtration media in a self-contained, pre-fabricated unit for filtration of hydrocarbon containing liquid by placing the unit in existing drains. Container 20 is sized to fit most standard drain cavities or piping having diameters of about 2 to 10 inches. Preferably, container 20 is made from polyvinylchloride (PVC) having a diameter slightly smaller than the drain or piping diameter to allow the container to easily slide into the existing drain or pipe. Other construction materials for container 20 may include, but is not limited to, polyolefins, acrylics, polycarbonate, and metals such as aluminum, copper, or steel.

The top of container 20, referenced by 20A, has an external lip 23 and an internal lip 26. FIG. 2 is a top plan view of the container 20. The top of container 20 may be manufactured as a separate top plate 21 (resembling a wide ring in this case) and attached to the cylindrical portion of container 20 although it is not necessary. The bottom of container 20, referenced by 20B, has a second internal lip 29. Likewise, the bottom of container 20 may also be a separate bottom plate 22 resembling a wide ring to fit flush with the outer diameter of container 20.

A first porous layer 33 is placed within container 20 and supported on its periphery by the second internal lip 29. Porous layer 33 may be any filter cloth, fabric or screening. Filtration media 40 is compressed into container 20 as a cake and is held within container 20 by porous layer 33. The filtration media may be formulated by using any of the commercially available polymers listed above, such as Shellvis®40 from Shell Chemical Company, by grinding, cutting or chopping the polymer to an average particle size of about 200 to 700 microns. The polymeric absorbent may also be further compounded to a polymeric blend incorporating about 10 to 50% recycled or waste plastic scrap, scrap polyolefins, inorganic fillers, or other inexpensive, relatively inert solids. Other compounding materials may include clay, talc, mica, ground glass, silica, and mixtures thereof. The polymer particles may then be mechanically mixed to uniformity with about 50% coarse sand as the filtration enabler.

As an example, the filtration media may be packed into container 20 or other drainage ditch or pipe in the following manner: packing a first portion of filtration media comprising a virgin polymeric absorbent and filtration enabler into container 20; followed by a second portion of filtration media incorporating about 25% of the polymeric blend; then a third portion of filtration media incorporating about 50% of the polymeric blend; and, finally, a fourth portion of filtration media incorporating about 75 to 100% of the polymeric blend.

As depicted in FIG. 1, the height 'h' of filtration media 40 may be anywhere from 2 to 36 inches depending upon the flow rate desired, the diameter 'd' of container 20, and the amount of hydrocarbons to be contained. For large drains in outside tank farms and around utility installations, the height of the filtration media bed would be in the range of about 24 to 60 inches to ensure that the filtration media will plug before any hydrocarbons are discharged in the event of tank failure.

A second porous layer 37 is placed over the cake of filtration media 40 capping off the cake. Although not necessary to practice the invention, crushed stones or other sediment 45 may be used to fill the remainder of container 20 to control the contact force of the hydrocarbon containing liquid to the filtration media 40. The stones 45 are held within container 20 by a piece of netting 48 inserted to fit under the internal lip 26 of the top of container 20. The netting is easily removable to provide access for cleaning the sediment to improve flow.

A soft, pliable gasket 52 is fitted around the periphery of container 20 and the entire container is then slid into an existing drain. The instant embodiment would be most useful in floor drains in workshops or garages where liquid may be contaminated with hydrocarbons. Gasket 52 provides a tight, yet temporary, leak proof seal around the container 20 to the drain. Preferably, gasket 52 comprises durourethane.

As the hydrocarbon containing liquid flows toward the drain, the liquid flows through sediment 45 and porous layer 37 to contact filtration media 40. The hydrocarbons partially dissolve the surface of the polymeric absorbent granules. The granules become tacky until the hydrocarbons are further absorbed into the granule. As the hydrocarbon containing liquid flows through the filtration media 40, the hydrocarbons are absorbed by the polymeric absorbent and clarified liquid flows out through porous layer 33 substantially free of hydrocarbons.

If the hydrocarbon containing liquid contains an excessive amount of hydrocarbons or in the case of a hydrocarbon spill or leak, once the hydrocarbons come into contact with filtration media 40, the polymeric absorbent will plug and seal off the drain. At least a top portion of filtration media 40 will become a plug successfully sealing off and containing the hydrocarbon containing liquid. After correction of the spill or leak, container 20 may be removed and the plugged layers of polymeric absorbent removed to reveal fresh, unplugged absorbent. At this time, additional polymeric absorbent may be added to the container prior to replacing the container in the drain or the container may be placed right back into service depending upon the age of the unit and the degree of contamination.

The loose filtration media of the present invention may also be used in existing drainage ditches, pipes or pits in containment areas. A porous layer fitted to the area of the ditch would hold the loose filtration media in place. A second porous layer capping a cake of filtration media is disposed thereon followed by crushed stones or other coarse inert particulate matter to control the contact rate of the liquid to the filtration media. A grate or netting may be placed over the ditch to secure the contents. Alternatively, for ease of maintenance, the filtration media may be contained in a cartridge which may be dropped into the drainage cavity and sealed against the cavity walls. The height of the filtration media for large drains and pits in large containment areas will be about 24 to 60 inches, again depending upon flow rate requirements and the amount of hydrocarbons to be contained in the event of a spill or leak. Typical diameters of such large scale drainage ditches or pipes are about 18 to 48 inches. Again, in the event of a hydrocarbon spill or leak, the filtration media would solidify and plug the drainage ditch to effectively prevent discharge of the hydrocarbons into the environment. Once the emergency situation is rectified, the absorbed layers of the filtration media may be removed to reveal fresh filtration media below the plugged portion. At this time additional filtration media may be added as needed.

The present invention is seen as a most economical, foolproof way to discharge stormwater from spill containment areas while providing total containment in the event of a spill or leak. There are no moving parts to maintain, there is no power to pay for, and the invention can remove even trace amounts of hydrocarbons from the liquid flow. The invention is useful in floor drains of garages and service stations where gas and oil might be washed down a drain into a sewer or stream. It can be used in large diameter drains to evacuate storm liquid from tank farms, railroad yards and other large scale areas of potential hydrocarbon contamination. Gravity drains can be established such that this invention is provided as a self-contained unit that is simply dropped into the drain cavity, sealed against the cavity walls, so all liquid must flow through the drain. Where necessary, horizontal pipes may be prepared with the filtration media to either gravity drain or work under pressure from a pump. Separate filter units can also be prepared to operate solely under pump pressure as the driving force for the liquid.

The filtration media of the present invention may be employed in pits, pipes, and self-contained cartridges of various sizes to remove and contain hydrocarbons from a hydrocarbon containing liquid or a hydrocarbon spill or leak, and that the absorbent will form a plug in an excess of hydrocarbons entering the pit, pipe or cartridge.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filtration media bed for removal of hydrocarbons from hydrocarbon containing liquid comprising:
   a hydrocarbon absorbing polymeric absorbent comprising alternating units of at least two polymers selected from the group consisting of styrene, pentadiene, cyclopentadiene, butylene, ethylene, isoprene, butadiene, and propylene, said hydrocarbon absorbing polymeric absorbent having a particle size ranging from a fine powder to about 700 micron; and
   a filtration enabler intimately mixed with said polymeric absorbent to provide channels through said filtration media bed to achieve a desired flow rate of the hydrocarbon-free liquid, said filtration enabler having a particle size about the same as a particle size of said polymeric absorbent;

wherein upon contacting the filtration media bed with the hydrocarbons, the hydrocarbons partially dissolve a surface of said polymeric absorbent, prior to said polymeric absorbent substantially absorbing the hydrocarbons, whereby said polymeric absorbent becomes tacky and absorbs said hydrocarbons allowing hydrocarbon-free liquid to flow through said filtration media bed, and wherein upon excessive hydrocarbon exposure said polymeric absorbent dissolves, tackifies and forms a plug at least at a top portion of said filtration media bed to seal off and prevent further discharge of the hydrocarbons upon excessive hydrocarbon exposure.

2. The filtration media of claim 1 wherein said filtration enabler is present in a sufficient amount to control the flow of the hydrocarbon-free liquid.

3. The filtration media of claim 1 wherein said filtration enabler is an inert solid selected from the group consisting of recycled rubber, sand, gravel, vermiculite, recycled plastic chips and a mixture thereof.

4. The filtration media of claim 1 wherein said filtration media bed upon contacting an excessive amount of hydrocarbons forms said plug within said filtration media bed to seal and prevent further discharge of the hydrocarbons, whereby said plugged absorbent may be removed to reveal remaining fresh, unplugged absorbent.

5. The filtration media of claim 1 wherein said filtration media bed further includes an inert solid selected from the group consisting of plastic scrap, inorganic fillers, clay, talc, mica, ground glass, silica, and mixtures thereof.

6. The filtration media of claim 5 wherein said filtration enabler is an inert solid selected from the group consisting of recycled rubber, sand, gravel, vermiculite, recycled plastic chips and mixtures thereof.

7. The filtration media of claim 1 wherein said filtration enabler is an inert, non-absorbent material.

8. A portable device for placement in a drain for filtering hydrocarbons from hydrocarbon containing liquid comprising:

a rigid container having a first end and a second end, the first end having an external lip and a first internal lip, and the second end having a second internal lip;

a first porous layer disposed within said container on the second internal lip; and a filtration media bed capable of forming a plug in an excess of hydrocarbons comprising a hydrocarbon absorbing polymeric absorbent comprising alternating units of at least two polymers selected from the group consisting of styrene, pentadiene, cyclopentadiene, butylene, ethylene, isoprene, butadiene, and propylene, wherein upon contact with said hydrocarbons said hydrocarbon absorbing polymeric absorbent partially dissolves and tackifies thereby absorbing said hydrocarbons preventing discharge of said hydrocarbon into said environment, and wherein upon contact with said excessive amount of said hydrocarbon containing liquid, said polymeric absorbent partially dissolves, tackifies and forms said plug at least at a top portion of said filtration media bed to seal off and prevent further discharge of said hydrocarbons; and a filtration enabler intimately mixed with said polymeric absorbent to provide channels through said filtration media bed to achieve a desired flow rate of the hydrocarbon-free liquid, said filtration enabler having a particle size about the same as a particle size of said polymeric absorbent, said filtration media bed compressed into said container;

wherein the device may be inserted into an existing drainage device such that a hydrocarbon containing liquid is filtered through said device allowing hydrocarbon-free liquid to flow from said device.

9. The device of claim 8 further including a gasket, said gasket disposed under the external lip of said container to provide a snug, temporary, leak proof seal when said container is inserted into an existing drainage device.

10. The device of claim 8 further including a second porous film disposed over said filtration media bed;

a non-porous material disposed within said container over said second porous layer and said filtration media bed; and a netting disposed over said non-porous material, said netting fitted under the first internal lip of said container, wherein said non-porous material is adapted to control the contact rate of hydrocarbons to said filtration media bed.

11. The device of claim 8 wherein said filtration media bed has a thickness within said container adapted to substantially filter out hydrocarbons while capable of forming said plug in an excess of hydrocarbons.

12. The device of claim 8 wherein said filtration enabler is an inert solid selected from the group consisting of recycled rubber, sand, gravel, vermiculite, recycled plastic chips and a mixture thereof.

13. The device of claim 8 wherein the hydrocarbons flow through said container to contact said filtration media bed, and wherein the polymeric absorbent of said filtration media bed is adapted to form a tacky, semi-solid prior to absorption of the hydrocarbons creating said plug.

14. The device of claim 8 wherein the hydrocarbon containing liquid has an excessive amount of hydrocarbons such that the polymeric absorbent of said filtration media bed is adapted to form said plug at least at said top portion of said filtration media bed preventing discharge of the hydrocarbons, whereby said plugged absorbent may be removed to reveal remaining fresh, unplugged absorbent.

15. The device of claim 8 further including a float situated in a sufficient space within said container between the second porous layer and the second internal lip wherein said float prevents back wash of any liquid through said container while allowing the hydrocarbon-free liquid to flow through.

16. A device for the containment of hydrocarbon containing liquid comprising:

a rigid container having a first end and a second end, the first end having an external lip and a first internal lip, and the second end having a second internal lip;

a first porous layer disposed within said container on the second internal lip; and a filtration media bed comprising:

a hydrocarbon absorbing polymeric absorbent blend comprising alternating units of at least two polymers selected from the group consisting of styrene, pentadiene, cyclopentadiene, butylene, ethylene, isoprene, butadiene, and propylene mixed with up to about 50% inert solids, wherein said hydrocarbon absorbing polymeric absorbent blend is adapted to partially dissolve and tackify upon contact with said hydrocarbons and form a filtration barrier at least at a top portion of said filtration media bed upon excessive hydrocarbon exposure; and a filtration enabler intimately mixed with said polymeric absorbent blend to provide channels through said filtration media bed to achieve a desired flow rate of the hydrocarbon-free liquid, said filtration enabler having a particle size about the same as a particle size of said polymeric absorbent blend, said filtration media bed compressed into said container;

wherein upon contact with a hydrocarbon containing liquid having an excess of hydrocarbons, said filtration media bed forms said filtration barrier at least at said top portion of said filtration media bed to seal and prevent further discharge of the hydrocarbon containing liquid.

17. The device of claim 16 wherein said filtration enabler is an inert solid selected from the group consisting of recycled rubber, sand, gravel, vermiculite, recycled plastic chips and a mixture thereof.

18. The device of claim 16 further including a second porous layer disposed over said filtration media bed;

a non-porous material disposed within said container over said second porous layer and said filtration media bed; and a netting disposed over said non-porous material, said netting fitted under the first internal lip of said container, wherein said non-porous material is adapted to control the contact rate of hydrocarbons to said filtration media bed.

19. The device of claim 16 wherein said filtration enabler is an inert, non-absorbent material.

20. A filtration media bed for absorbing hydrocarbons from hydrocarbon containing liquid capable of plugging during hydrocarbon overload comprising:

a hydrocarbon absorbing polymeric absorbent blend comprising alternating units of at least two polymers selected from the group consisting of styrene, pentadiene, cyclopentadiene, butylene, ethylene, isoprene, butadiene, and propylene mixed with up to about 50% inert solids, wherein said hydrocarbon absorbing polymeric absorbent is adapted to partially dissolve and tackify upon contact with said hydrocarbons and form a filtration barrier at least at a top portion of said filtration media bed upon excessive hydrocarbon exposure, said polymeric absorbent blend having a particle size ranging from about 200 micron to about 700 micron; and up to about 75% filtration enabler mixed with said hydrocarbon absorbing polymeric absorbent blend, said filtration enabler adapted to form channels within the filtration media bed to provide a good flow rate through the filtration media bed while absorbing substantially all hydrocarbons in the waste stream prior to plugging during hydrocarbon overload, said filtration enabler having substantially the same particle size as said polymeric absorbent blend.

21. A portable device for placement in a drain for filtering hydrocarbons from hydrocarbon containing liquid comprising:

a rigid container having a first end and a second end, the first end having an external lip and a first internal lip, and the second end having a second internal lip;

a first porous layer disposed within said container on the second internal lip; and a filtration media bed having a thickness within the container adapted to substantially filter out hydrocarbons while capable of forming a plug in an excess of hydrocarbons comprising a hydrocarbon absorbing polymer absorbent blend of alternating units of at least two polymers selected from the group consisting of styrene, pentadiene, cyclopentadiene, butylene, ethylene, isoprene, butadiene, and propylene mixed with up to about 50% inert solids, wherein said polymer absorbent blend is adapted to partially dissolve and tackify upon contact with said hydrocarbons and form said plug at least at a top portion of said filtration media bed upon excessive hydrocarbon exposure, said polymeric absorbent blend having a particle size ranging from about 200 micron to about 700 micron; and up to about 75% filtration enabler mixed with said hydrocarbon absorbing polymeric absorbent blend, said filtration enabler adapted to form channels within the filtration media bed to provide a good flow rate through the filtration media bed while absorbing substantially all hydrocarbons in the waste stream prior to plugging during hydrocarbon overload, said filtration enabler having substantially the same particle size as said polymeric absorbent blend;

wherein the device may be inserted into an existing drainage device such that a hydrocarbon containing liquid is filtered through said device allowing hydrocarbon-free liquid to flow from said device.

* * * * *